US010981365B2

(12) United States Patent
Crawley et al.

(10) Patent No.: US 10,981,365 B2
(45) Date of Patent: Apr. 20, 2021

(54) POLYMERIC MATERIALS

(71) Applicant: VICTREX MANUFACTURING LIMITED, Thornton Cleveleys (GB)

(72) Inventors: Christopher Crawley, Great Sankey (GB); Paul Corscadden, Hartford (GB); Laurie Crouch, Thornton Cleveleys (GB); Jason Paul Bell, Burnley (GB)

(73) Assignee: VICTREX MANUFACTURING LIMITED, Thornton Cleveleys (GB)

( * ) Notice: Subject to any disclaimer, the term of this patent is extended or adjusted under 35 U.S.C. 154(b) by 379 days.

(21) Appl. No.: 15/314,619

(22) PCT Filed: Jun. 2, 2015

(86) PCT No.: PCT/GB2015/051599
§ 371 (c)(1),
(2) Date: Nov. 29, 2016

(87) PCT Pub. No.: WO2015/189567
PCT Pub. Date: Dec. 17, 2015

(65) Prior Publication Data
US 2017/0197393 A1 Jul. 13, 2017

(30) Foreign Application Priority Data
Jun. 9, 2014 (GB) .................................... 1410221

(51) Int. Cl.
| | |
|---|---|
| *B32B 27/28* | (2006.01) |
| *C08G 65/40* | (2006.01) |
| *B32B 15/08* | (2006.01) |
| *B32B 15/18* | (2006.01) |
| *B32B 15/20* | (2006.01) |
| *B32B 27/20* | (2006.01) |
| *C08L 71/00* | (2006.01) |
| *B29C 43/00* | (2006.01) |
| *B29C 43/02* | (2006.01) |
| *B29C 69/00* | (2006.01) |
| *B32B 37/06* | (2006.01) |
| *C08K 3/34* | (2006.01) |
| *C08K 7/14* | (2006.01) |
| *B29K 71/00* | (2006.01) |
| *B29L 7/00* | (2006.01) |

(52) U.S. Cl.
CPC .......... *B32B 27/285* (2013.01); *B29C 43/003* (2013.01); *B29C 43/02* (2013.01); *B29C 69/001* (2013.01); *B32B 15/08* (2013.01); *B32B 15/18* (2013.01); *B32B 15/20* (2013.01); *B32B 27/20* (2013.01); *B32B 27/288* (2013.01); *B32B 37/06* (2013.01); *C08G 65/4012* (2013.01); *C08G 65/4025* (2013.01); *C08K 3/34* (2013.01); *C08K 7/14* (2013.01); *C08L 71/00* (2013.01); *B29K 2071/00* (2013.01); *B29L 2007/008* (2013.01); *B32B 2262/0269* (2013.01); *B32B 2262/101* (2013.01); *B32B 2262/106* (2013.01); *B32B 2307/54* (2013.01); *B32B 2307/702* (2013.01); *B32B 2311/18* (2013.01); *C08G 2650/40* (2013.01); *C08K 2201/003* (2013.01); *C08K 2201/004* (2013.01)

(58) Field of Classification Search
CPC ................................................. B32B 27/285
See application file for complete search history.

(56) References Cited

U.S. PATENT DOCUMENTS

| | | | |
|---|---|---|---|
| 4,717,761 A | 1/1988 | Staniland | |
| 4,767,838 A | 8/1988 | Clendinning et al. | |
| 5,869,130 A | 2/1999 | Ferrier | |
| 2002/0134939 A1* | 9/2002 | Giedd | G01J 5/04 250/338.1 |
| 2002/0185199 A1* | 12/2002 | Myers | A01N 25/34 148/537 |
| 2004/0070959 A1* | 4/2004 | Sakai | H05K 1/189 361/792 |
| 2004/0096584 A1* | 5/2004 | Naruskevicius | C23C 18/2006 427/306 |
| 2005/0142036 A1* | 6/2005 | Kim | B01L 3/502707 422/504 |
| 2006/0042078 A1* | 3/2006 | Takeuchi | H05K 1/186 29/830 |

(Continued)

FOREIGN PATENT DOCUMENTS

| | | |
|---|---|---|
| CN | 1400094 A | 3/2003 |
| CN | 102602080 A | 7/2012 |

(Continued)

OTHER PUBLICATIONS

International Search Report (PCT/ISA/210) dated Aug. 27, 2015, by the European Patent Office as the International Searching Authority for International Application No. PCT/GB2015/051599.

(Continued)

Primary Examiner — Megan McCulley
(74) Attorney, Agent, or Firm — Buchanan Ingersoll & Rooney PC

(57) ABSTRACT

A component comprises a first part and a second part, wherein said second part is in contact with said first part, wherein:
(i) said first part comprises a polymer having a repeat unit of formula —O-Ph-O-Ph-CO-Ph—    I and a repeat unit of formula —O-Ph-Ph-O-Ph-CO-Ph    II wherein Ph represents a phenylene moiety; and
(ii) said second part comprises a metal.

22 Claims, No Drawings

(56) References Cited

U.S. PATENT DOCUMENTS

| | | | |
|---|---|---|---|
| 2011/0212290 A1* | 9/2011 | Crawley | B29C 71/0063 428/80 |
| 2011/0250377 A1 | 10/2011 | Qin | |
| 2012/0178834 A1* | 7/2012 | Linder | B01D 67/0006 521/27 |
| 2012/0203317 A1* | 8/2012 | Valentine | C08L 81/06 607/116 |

FOREIGN PATENT DOCUMENTS

| | | |
|---|---|---|
| DE | 10 2004 048 625 A1 | 4/2006 |
| EP | 0 184 458 A2 | 5/1986 |
| EP | 0 266 132 A2 | 5/1988 |
| EP | 2 334 487 B1 | 2/2013 |
| JP | 2000-272049 A | 10/2000 |
| WO | 2009/058362 A1 | 5/2009 |
| WO | 2013/092492 A1 | 6/2013 |
| WO | 2014/037374 A1 | 3/2014 |
| WO | WO 2015/019047 A1 | 2/2015 |

OTHER PUBLICATIONS

Written Opinion (PCT/ISA/237) dated Aug. 27, 2015, by the European Patent Office as the International Searching Authority for International Application No. PCT/GB2015/051599.

United Kingdom Search Report issued by the United Kingdom Intellectual Property Office dated Dec. 9, 2014 in Application No. GB1410221.4.

Zhicheng et al., Handbook of Bonding Technology, 1st Edition, Shanghai Science and Technology Publishing House, pp. 405-408, Published Aug. 31, 1988. (5 pages).

Office Action (The Third Office Action) dated May 27, 2019, by the State Intellectual Property Office of People's Republic of China in corresponding Chinese Patent Application No. 201580030246.6 and an English Translation of the Office Action. (25 pages).

McKnight et al., "The Role of Surface Preparation on the Performance of Metal to Polymer Adhesive Joints," Proceedings of the 10th Annual ASMESO Advanced Composites Conference, Dearborn, Michigan, USA, (Nov. 7-10, 1994), pp. 585-594.

\* cited by examiner

POLYMERIC MATERIALS

This invention relates to polymeric materials. Preferred embodiments relate to components which comprise first and second parts in direct contact with one another, wherein one of the parts comprises a metal. For example, the first part may be overmoulded on the second part.

Alternatively, a polymeric material may be used to bond two metal parts together.

Many structures are produced which comprise metals bonded to polymeric materials. For example in mobile phone technology, a casing may be made from aluminium and parts made from a polymeric material may be bonded to the casing. There are also many other industries in which it is desirable to bond metals to polymeric materials.

Preferred thermoplastics for overmoulding on metal or as an adhesive used for joining metal parts should be crystalline so that the thermoplastic has high chemical resistance, should have excellent mechanical properties and should have high bond strength to the metal.

Polyetheretherketone (PEEK) is a well-known high performance thermoplastic with excellent chemical and mechanical properties. However, although it can be bonded reasonably well to metals, it would be desirable for such a high performance thermoplastic to bond more strongly to metal. It is an object of the present invention to address the aforementioned problem.

According to a first aspect of the invention, there is provided a component comprising a first part and a second part, wherein said second part is in contact with said first part, wherein:

(i) said first part comprises a polymer having a repeat unit of formula

—O-Ph-O-Ph-CO-Ph-  I and a repeat unit of formula

—O-Ph-Ph-O-Ph-CO-Ph  II wherein Ph represents a phenylene moiety; and (ii) said second part comprises a metal.

Said second part may comprise a metal selected from aluminium, steel and titanium. In said component, said polymer may be in contact with said aluminium, steel or titanium.

Said second part preferably comprises (for example consists essentially of) a metal selected from aluminium and steel, for example stainless steel. Preferably, in said component, said polymer is in contact with said aluminium or steel. Said polymer may be in contact with less than 95%, for example less than 85%, of the total surface area of the second part. Thus, at least 5% or at least 15% of the total surface area of said second part may not be in contact with said first part or said polymer. At least 5% or at least 15% of the total surface area of said second part may be exposed.

Said second part may have a non-circular cross-section.

% crystallinity described herein may be measured as described in Example 22.

Said repeat units I and II are preferably in the relative molar proportions I:II of from 65:35 to 95:5.

Preferably, in said polymer, the following relationship applies:

$\log_{10}(X\%) > 1.50 - 0.26 \text{ MV}$;

wherein X % refers to the % crystallinity measured as described in Example 22 and MV refers to the melt viscosity measured using capillary rheometry operating at 340° C. at a shear rate of 1000 s$^{-1}$ using a circular cross-section tungsten carbide die, 0.5 mm (capillary diameter)×3.175 mm (capillary length). The MV measurement is taken 5 minutes after the polymer has fully melted, which is taken to be 5 minutes after the polymer is loaded into the barrel of the rheometer.

The phenylene moieties (Ph) in each repeat unit I and II may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. In many applications it is preferred for the polymeric material to be highly crystalline and, accordingly, the polymeric material preferably includes high levels of phenylene moieties with 1,4-linkages.

In a preferred embodiment, at least 95%, preferably at least 99%, of the number of phenylene moieties (Ph) in the repeat unit of formula I have 1,4-linkages to moieties to which they are bonded. It is especially preferred that each phenylene moiety in the repeat unit of formula I has 1,4-linkages to moieties to which it is bonded.

In a preferred embodiment, at least 95%, preferably at least 99%, of the number of phenylene moieties (Ph) in the repeat unit of formula II have 1,4-linkages to moieties to which they are bonded. It is especially preferred that each phenylene moiety in the repeat unit of formula II has 1,4-linkages to moieties to which it is bonded.

Preferably, the phenylene moieties in repeat unit of formula I are unsubstituted. Preferably, the phenylene moieties in repeat unit of formula II are unsubstituted.

Said repeat unit of formula I suitably has the structure

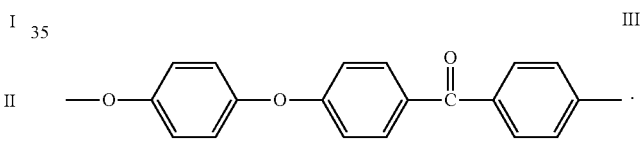

III

Said repeat unit of formula II suitably has the structure

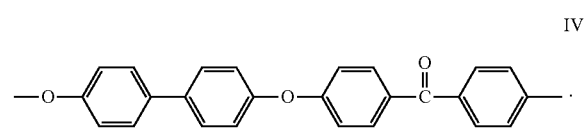

IV

Said polymer may include at least 68 mol %, preferably at least 71 mol % of repeat units of formula III. Particular advantageous polymers may include at least 72 mol %, or, especially, at least 74 mol % of repeat units of formula III. Said polymer may include less than 90 mol %, suitably 82 mol % or less of repeat units of formula III. Said polymer may include 68 to 82 mol %, preferably 70 to 80 mol %, more preferably 72 to 77 mol % of units of formula III.

Said polymer may include at least 10 mol %, preferably at least 18 mol %, of repeat units of formula IV. Said polymer may include less than 32 mol %, preferably less than 29 mol % of repeat units of formula IV. Particularly advantageous polymers may include 28 mol % or less; or 26 mol % or less of repeat units of formula IV. Said polymer may include 18 to 32 mol %, preferably 20 to 30 mol %, more preferably 23 to 28 mol % of units of formula IV.

The sum of the mol % of units of formula III and IV in said polymer is suitably at least 95 mol %, is preferably at least 98 mol %, is more preferably at least 99 mol % and, especially, is about 100 mol %.

The ratio defined as the mol % of units of formula III divided by the mol % of units of formula IV may be in the range 1.8 to 5.6, is suitably in the range 2.3 to 4 and is preferably in the range 2.6 to 3.3.

The Tm of said polymer may be less than 330° C., is suitably less than 320° C., is preferably less than 310° C. In some embodiments, the Tm may be less than 306° C. The Tm may be greater than 280° C., or greater than 290° C., 295° C. or 300° C. The Tm is preferably in the range 300° C. to 310° C.

In a preferred embodiment, said polymer has a Tg in the range 145° C.-155° C., a Tm in the range 300° C. to 310° C. and the difference between the Tm and Tg is in the range 145° C. to 165° C.

Said polymer may have a crystallinity measured as described in Example 22 of at least 25%.

Said polymer suitably has a melt viscosity (MV) of at least 0.10 $kNsm^{-2}$, preferably has a MV of at least 0.15 $kNsm^{-2}$, more preferably at least 0.20 $kNsm^{-2}$, especially at least 0.25 $kNsm^{-2}$.

Said polymer may be part of a composition which may include said polymer and a filler. In this case, said composition is suitably in contact with said metal. Said filler may include a fibrous filler or a non-fibrous filler. Said filler may include both a fibrous filler and a non-fibrous filler.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibres.

Preferably, said filler comprises one or more fillers selected from glass fibre, carbon fibre, aramid fibres, carbon black and a fluorocarbon resin. More preferably, said filler comprises glass fibre or carbon fibre. The most preferred filler is glass fibre.

A composition as described may include 20 to 99.9 wt % (e.g. 20 to 70 wt %) of said polymeric material and 0.1 to 80 wt % (e.g. 30 to 80 wt %) of filler. Preferred embodiments include greater than 10 wt %, more preferably greater than 20 wt % of filler.

Said component suitably comprises said first and second parts in direct contact and suitably the bond between the parts is extremely strong. Whilst there may be a mechanical connection between the first and second parts, preferably the first and second parts are secured by chemical interaction between the polymer and metal. Thus, the force needed to separate the first and second parts is suitably greater (e.g. at least 10%, 25% or 50% greater) than the force that would be required to separate the same first and second parts if there was only a mechanical (and no chemical) interaction between the first and second parts.

The area of the first part in contact with the second part may be at least 1 $cm^2$, at least 10 $cm^2$ or at least 25 $cm^2$.

A thickness of the first part measured perpendicular to the interface between the first and second parts may be at least 1 mm or at least 2 mm. The thickness may be less than 20 mm, less than 15 mm or less than 10 mm.

A thickness of the second part measured perpendicular to the interface between the first and second parts may be at least 1 mm or at least 2 mm. The thickness may be less than 20 mm, less than 15 mm or less than 10 mm.

Said component may have a volume of at least 5 $cm^3$, for example of at least 25 $cm^3$ or at least 100 $cm^3$.

Said component may have a maximum dimension which is at least 5 cm, at least 10 cm or at least 25 cm.

In a first embodiment, said first part overlies said second part. Said first part may comprise an overmoulded region on said second part.

Said component may be part of an electronics device, for example a mobile electronics device such as a device for connection to the worldwide web or for communications. Said component may be a mobile phone. Said first and second parts may comprise a frame housing or enclosure of such an electronics device. Alternatively, said component may be for an aerospace or automotive application. For example, it may be a part of an aeroplane or vehicle.

In one embodiment, said component may comprise only one part which comprises a metal selected from aluminium and steel (i.e. only one second part) in contact with said first part. In a second embodiment, said component may comprise two of said second parts which are secured together by said polymer which defines said first part. That is, said first part is in contact with two second parts each of which comprises a metal, suitably selected from aluminium and steel (and preferably said two second parts comprise the same metal).

According to a second aspect of the invention, there is provided a method of making a component (e.g. as described according to the first aspect), the method comprising:

(a) selecting a second part comprising a metal;

(b) selecting a first part comprising said polymer of the first aspect or a precursor of said first part which comprises said polymer;

(c) contacting said second part with said first part or said precursor.

Said polymer and said metal may have any feature of said polymer and said metal described in the first aspect.

When said polymer is part of a composition, step (c) may comprise contacting said composition with said second part.

Preferably, in the method, said first part or said precursor of said first part is at a temperature above ambient temperature in step (c). It may be at a temperature of at least 50° C., at least 150° C., at least 250° C., or at least 300° C. In step (c), said polymer may be at a temperature which is greater than its Tm. In this case, the method may comprise moulding a precursor of said first part (e.g. molten polymer, optionally including fillers) on and/or around said second part. Said second part may have a preformed, suitably solid, shape immediately prior to contact with said first part or precursor in step (c). Furthermore, preferably the shape remains substantially unchanged in the method. The method preferably includes introducing said second part into a tool, for example a mould such as a mould for injection moulding, and contacting said second part with a precursor of said first part (e.g. molten polymer, optionally including fillers) in said tool. Thus, formation of said first part may comprise injection moulding, for example using a precursor of said first part. In step (c), preferably, a precursor of said first part is overmoulded on said second part.

Prior to step (c) of the method, said second part is preferably treated to alter its surface with which said first part or precursor is subsequently contacted. For example, said surface may be treated to remove contaminants and/or to remove grease and/or to chemically modify the surface and/or to alter the surface profile. Treatment of said surface may be selected from flame treatment, mechanical abrasion (e.g. shot blasting) and chemical treatment (e.g. etching).

A preferred treatment comprises etching. Treatment may comprise a first step which comprises treating the second part with an oxidizing formulation which includes a $Fe^{3+}$ compound.

Said $Fe^{3+}$ compound may be involved in the oxidation of the surface of the metal which it contacts, particularly wherein the metal is aluminium.

Said $Fe^{3+}$ compound suitably includes sulphate moieties. The only cations in said $Fe^{3+}$ compound are preferably $Fe^{3+}$. The only anions in said $Fe^{3+}$ compound are preferably $SO_4^{2-}$. Said $Fe^{3+}$ compound is preferably a ferric sulphate. Said ferric sulphate may be dehydrated or hydrated.

Said oxidizing formulation suitably includes at least 6 wt %, preferably at least 10 wt %, more preferably at least 13 wt % of $Fe_2(SO_4)_3$, on a dry matter basis (i.e. excluding any water of hydration that may have been included in the ferric sulphate prior to incorporation into the oxidizing formulation). Said oxidizing formulation may include less than 30 wt %, less than 25 wt % or less than 20 wt % of $Fe_2(SO_4)_3$ on the same basis.

Said oxidizing formulation preferably includes a strong acid. Said formulation suitably has a pH of less than 1, preferably less than 0.5, more preferably less than 0.1.

Said oxidizing formulation preferably includes sulphuric acid, suitably having a concentration of at least 95%, preferably at least 96%. The concentration may be less than 100% or less than 99.5%. Said formulation suitably includes 10 to 40 wt % of sulphuric acid having a concentration in a range 95 to 99.5%. Preferably, said oxidizing formulation includes 10 to 30 wt % of sulphuric acid of concentration 96 to 99%.

Said oxidizing formulation may include other components at a weight in the range 0 to 5 wt %, for example 0 to 2 wt %. The balance in said formulation is preferably water. Said formulation may include 40 to 84 wt %, preferably 60 to 80 wt %, for example 70 to 80 wt % water.

Said oxidizing formulation may include 6 to 30 wt % (preferably 6 to 15 wt %) $Fe_2(SO_4)_3$, 10 to 40 wt % (preferably 10 to 20 wt %) of sulphuric acid of concentration in the range 95 to 100% (preferably 96% to 99.5%) and 30 to 84 wt % (preferably 65 to 84 wt %) water.

Treatment of said second part is preferably undertaken at a temperature of greater than ambient temperature, for example at greater than 40° C. or greater than 50° C.; it may be undertaken at a temperature in the range 50 to 70° C. In the first step, at least a surface of the second part (which surface is to make contact with said first part) (hereinafter referred to as "the bonding surface" of the second part) is contacted with said oxidizing formulation, suitably for at least 5 minutes; and suitably for less than 60 minutes or less than 25 minutes. The second part may be immersed in said oxidizing formulation.

The time between the end of the first step, suitably after the first component is removed from contact with a mass of said oxidizing formulation, is suitably less than 3 hours or less than 2 hours. Steps may be taken to limit contact of the first component with ambient oxygen after the first step.

After the first step and prior to step (c) of the method, said first part (especially the bonding surface thereof) may be washed, suitably with a solvent which comprises or consists essentially of, water.

Preferably, said process comprises a step (a)*, prior to said first step. Step (a)* suitably comprises treating said second part (especially the bonding surface thereof) to clean it, remove contaminants, or remove oxide and/or an oxide layer. Removal of an oxide layer (e.g. an aluminium oxide layer) may be especially important wherein said metal comprises aluminium.

Treatment of said second part to clean it may comprise contacting said second part with a cleaning formulation comprising an acid. Said cleaning formulation preferably includes sulphuric acid; it preferably also includes nitric acid (e.g. having a concentration in the range 10 to 50% or 20 to 35%). Said sulphuric acid may be concentrated, suitably having a concentration in the range 95 to 99.5%.

In step (a)*, said treatment is preferably undertaken at a temperature of greater than ambient temperature, for example at greater than 40° C. or greater than 50° C.; it may be undertaken at a temperature in the range 50 to 70° C.

In step (a)*, at least a surface of the second part (which surface is to make contact with said first part) is contacted with said cleaning formulation, suitably for at least 5 minutes; and suitably for less than 60 minutes or less than 25 minutes. The second part may be immersed in said cleaning formulation.

Prior to step (a)*, said second part (especially the bonding surface of the second part) may be cleaned with an organic solvent, for example acetone.

Prior to step (a)*, said second part (especially the bonding surface of the second part) may be cleaned with an organic solvent, for example acetone.

It may be possible to assess a component treated with said oxidizing formulation which includes $Fe^{3+}$ as described. Thus, the invention of the first aspect extends to a component of the first aspect, wherein a residual iron-containing compound is associated with the assembly, for example between the first and second parts. The iron compound may comprise residue remaining after the process of the second aspect has been carried out. The iron compound may comprise $Fe^{2+}$. The iron compound may be $FeSO_4$.

Preferably, a sulphur-containing compound (e.g. an $SO_4^{2-}$-containing compound) is associated with the component for example between the first and second parts.

When said metal preferably comprises aluminium, said aluminium suitably includes a continuous aluminium oxide layer which may be corrosion resistant. The oxide layer is suitably pitted and said polymer of the first aspect is preferably present in the pits. Thus, in the method of the first aspect, the melt viscosity (MV) of the polymer is preferably such, during the process, that it can flow into the pits suitably to "key" the polymer to the aluminium.

Said component of the first aspect is preferably a part of an electronics device, for example part of a casing of an electronics device, for example a mobile communications device. Said assembly may be a casing for a mobile phone. Alternatively, said component may be for an aerospace or automotive application. For example, it may be a part of an aeroplane or vehicle.

Any feature described according to the first aspect may be combined with any feature described according to the second aspect mutatis mutandis.

Specific embodiments of the invention will now be described, by way of example.

The following materials are referred to hereinafter:

talc—Jetfine (Trade Mark) 3CA with D50<10 μm.

Polymer composition A—PEEK 90G—polyetheretherketone (PEEK) having a melt viscosity (MV) of 0.09 $KNsm^{-2}$ (measured as described herein) obtained from Victrex Manufacturing Ltd.

Polymer composition B—PEEK-PEDEK—a copolymer made as described in Example 1 having an MV of 0.15 $KNsm^{-2}$ (measured as described herein).

Polymer composition C—PEEK-PEDEK TL20—a composition comprising 80 wt % of the copolymer of Example 1 and 20 wt % of talc.

Polymer composition D—PEEK 90G TL20—a composition comprising 80 wt % of PEEK 90G and 20 wt % of talc.

Polymer composition E—PEEK 90G TL20 GL15—a composition comprising 65 wt % of PEEK 90G, 20 wt % talc and 15 wt % chopped glass fibre (bundle length 3-6 μm and fibre diameter 10 μm).

Polymer Composition F—PEEK-PEDEK TL20GL15—a composition comprising 65 wt % of Polymer Composition B, 20 wt % talc and 15 wt % chopped glass fibre (bundle length 3-6 μm and fibre diameter 10 μm.

Polymer Composition G—PEEK-PEDEK TL20GL30—a composition comprising 50 wt % of Polymer Composition B, 20% talc and 30 wt % chopped glass fibre.

The copolymer used in polymer compositions B, C, F and G was made as follows:

EXAMPLE 1—PREPARATION OF POLYETHERETHERKETONE (PEEK)-POLYETHERDIPHENYLETHERKETONE (PEDEK) COPOLYMER

A 300 litre vessel fitted with a lid, stirrer/stirrer guide, nitrogen inlet and outlet was charged with diphenylsulphone (125.52 kg) and heated to 150° C. Once fully melted 4,4'-diflurobenzophenone (44.82 kg, 205.4 mol), 1,4-dihydroxybenzene (16.518 kg, 150 mol) and 4,4'-dihydroxydiphenyl (9.311 kg, 50 mol) were charged to the vessel. The contents were then heated to 160° C. While maintaining a nitrogen blanket, dried sodium carbonate (21.368 kg, 201.6 mol) and potassium carbonate (1.106 kg, 8 mol), both sieved through a screen with a mesh of 500 micrometres, were added. The D50 of the sodium carbonate was 98.7 μm. The temperature was raised to 180° C. at 1° C./min and held for 100 minutes. The temperature was raised to 200° C. at 1° C./min and held for 20 minutes. The temperature was raised to 305° C. at 1° C./min and held until desired melt viscosity was reached, as determined by the torque rise of the stirrer. The required torque rise was determined from a calibration graph of torque rise versus MV. The reaction mixture was poured via a band caster into a water bath, allowed to cool, milled and washed with acetone and water. The resulting polymer powder was dried in a tumble dryer until the contents temperature measured 112° C.

The following treatments are referred to hereinafter.

Metal samples were degreased by wiping with acetone.

Treatment 1—Flame Treatment

This involved skimming a naked flame over the surface of metal samples.

Treatment 2—Shot-Blasting

Metal samples were grit blasted with virgin white aluminium oxide for several minutes ensuring that the surface was evenly roughened.

Treatment 3—Etching Method 1

Metal foil strips (75 mm×200 mm) of gauge 0.125 μm were wiped with acetone. Concentrated sulphuric acid (270 ml) and 30% nitric acid (85 ml) were added slowly with stirring to 1.5 L of deionised water. The solution was maintained at a temperature of 60-65° C. and the metal foil strips were immersed in it for 30 minutes before being washed with deionised water and dried in a stream of hot air. Preparation of test samples subsequently takes place within two hours.

Treatment 4—Etching Method 2

Metal foil strips (75 mm×200 mm) of gauge 0.125 μm were wiped with acetone. Concentrated sulphuric acid 98.5% (270 ml) and 30% nitric acid (85 ml) were added slowly with stirring to 1.5 L of deionised water and the solution was maintained at a temperature of 60-65° C. Ferric sulphate (122.5 g, 0.3 mol) was dissolved in 185 ml of concentrated 98.5% sulphuric acid and added slowly with stirring to 1 L of deionised water; and the solution was maintained at a temperature of 60-65° C. Metal foil strips were immersed in the sulphuric/nitric acid solution for 30 minutes before being washed with deionised water and dried in a stream of hot air. They were again wiped with acetone and then immersed in the ferric sulphate solution for 8 minutes before being washed with deionised water and dried in an air circulating oven at 110° C. The foil strips were stored in a desiccator until bonded. Preparation of test samples subsequently takes place within two hours.

The following test procedure was used.

EXAMPLE 2—PREPARATION OF TEST SAMPLES

Dry polymer (7 g) was melted and compression moulded at 400° C. and 5 tonnes for 2 minutes then quenched in cold water producing an amorphous film of thickness 0.2-0.3 mm. The film was cut into 75 mm×150 mm strips. A strip of polymer film was sandwiched between two metal foil strips (75 mm×200 mm) treated by one of treatments 1 to 5 to produce a laminate. The laminate was then heated to 400° C. in the press to melt the polymer before being quenched into cold water, producing a test sample comprising two strips of foil bonded together by polymer; this sample was cut into 3 equal strips (25 mm×200 mm) for testing by a T-peel test, as described in Example 3.

EXAMPLE 3—T-PEEL TEST

The adhesive bond strength of the samples prepared as previously described was tested according to ISO 113399 on an Instron 2736-015 tensile testing machine operating with a 30 KN load cell using a T-peel test with a peel rate of 50 mm/minute and a peel extension of 200 mm.

Results

Data generated from the T-peel test from triplicate samples was averaged and the results reported in Table 1. Note: In the table, "C" designates a comparative example.

TABLE 1

| Example No. | Metal | Polymer Composition | Treatment Method Treatment No. | Force (N) |
|---|---|---|---|---|
| 4 | Aluminium | B | 1 | 3.113 |
| 5 | Aluminium | B | 2 | 15.948 |
| 6 | Aluminium | B | 3 | 10.759 |
| 7 | Aluminium | B | 4 | 45.785 |
| 8 | Aluminium | C | 1 | 47.705 |
| 9 | Aluminium | C | 2 | 49.927 |
| 10 | Aluminium | C | 3 | 49.569 |
| 11 | Aluminium | C | 4 | 54.364 |
| 12 | Aluminium | F | 1 | 12.731 |
| 13 | Aluminium | F | 2 | 39.373 |
| 14 | Aluminium | F | 3 | 20.524 |
| 15 | Aluminium | F | 4 | 35.451 |
| C4 | Aluminium | A | 1 | 2.099 |
| C5 | Aluminium | A | 2 | 5.409 |
| C6 | Aluminium | A | 3 | 2.936 |
| C7 | Aluminium | A | 4 | 21.183 |

TABLE 1-continued

| Example No. | Metal | Polymer Composition | Treatment Method Treatment No. | Force (N) |
|---|---|---|---|---|
| C8 | Aluminium | D | 1 | 13.632 |
| C9 | Aluminium | D | 2 | 41.805 |
| C10 | Aluminium | D | 3 | 26.558 |
| C11 | Aluminium | D | 4 | 37.655 |
| C12 | Aluminium | E | 1 | 5.632 |
| C13 | Aluminium | E | 2 | 35.597 |
| C14 | Aluminium | E | 3 | 8.921 |
| C15 | Aluminium | E | 4 | 13.535 |
| 16 | Stainless Steel | F | 1 | 28.664 |
| 17 | Stainless Steel | F | 3 | 46.757 |
| C16 | Stainless Steel | E | 1 | 20.841 |
| C17 | Stainless Steel | E | 3 | 35.382 |

The results show the superior bond strength between Polymer Composition B (a PEEK-PEDEK) copolymer) and the metal, when the same pre-treatment has been applied to the metal, as illustrated by the following:

compare Example 4 and Example C4;
compare Example 5 and Example C5;
compare Example 6 and Example C6;
compare Example 7 and Example C7
compare Example 8 and Example C8;
compare Example 9 and Example C9
compare Example 10 and Example C10;
compare Example 11 and Example C11;
compare Example 12 and Example C12;
compare Example 13 and Example C13;
compare Example 14 and Example C14;
compare Example 15 and Example C15;

Metals may be advantageously overmoulded using compositions comprising the PEEK-PEDEK copolymer as illustrated by the following examples.

EXAMPLES 18 TO 21 AND C18 TO C21—OVERMOULDING OF ALUMINIUM

Aluminium ingots (50 mm×25 mm×4 mm) were pre-treated either using Treatment 4 above (and overmoulded within 4 hours of etching) or by being sand-blasted using silica sand to produce a surface Ra of 5.

Samples were moulded on a BOY12A injection moulding machine with a tool temperature of 180° C. using moulding conditions as described in the manufacturer's datasheets for polymer composition D. For polymer Compositions C and G the following conditions were used: barrel temp 325° C. to 335° C., nozzle temp 340° C., holding pressure 30 bar, injection pressure 140 bar and screw speed 45 rpm. For each sample, the surface treated aluminium ingot was placed in the tool and allowed to reach the tool temperature and a layer of polymer (4 mm thick) was then moulded on to the surface of the aluminium.

The overmoulded samples were subjected to lap shear testing in a 3-point bend test with a 64 mm span at a speed of 2 mm/min and the max load before breakage determined. Results are provided in Table 2.

TABLE 2

| Example No. | Polymer Composition | Pre-treatment | Max Load (N) |
|---|---|---|---|
| 18 | C | Sand-blasting | 357 |
| 19 | C | Treatment 4 | 782 |
| 20 | G | Sand-blasting | 327 |
| 21 | G | Treatment 4 | 736 |
| C18 | D | Sand-blasting | 186 |
| C19 | D | Treatment 4 | 169 |

The maximum load strength demonstrates significantly improved bond strength of aluminium to PEEK-PEDEK compared to aluminium to PEEK.

Thus, it should now be appreciated that the PEEK-PEDEK copolymer unexpectedly and/or unpredictably bonds better to metals compared to PEEK.

Crystallinity referred to herein may be assessed as described in the following example.

EXAMPLE 22—DIFFERENTIAL SCANNING CALORIMETRY OF POLYARYLETHERKETONE OF EXAMPLE 1

Crystallinity may be assessed by several methods for example by density, by IR spectroscopy, by x ray diffraction or by differential scanning calorimetry (DSC). The DSC method has been used to evaluate the crystallinity that developed in the polymer of Example 1 using a Mettler Toledo DSC1 Star system with FRS5 sensor.

The Glass Transition Temperature (Tg), the Melting Temperature (Tm) and Heat of Fusions of Melting ($\Delta$Hm) for the polymer of Example 1 was determined using the following DSC method.

A dried sample of polymer was compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. An 8 mg plus or minus 3 mg sample of each film was scanned by DSC as follows:

Step 1 Perform and record a preliminary thermal cycle by heating the sample from 30° C. to 400° C. at 20° C./min.
Step 2 Hold for 5 minutes.
Step 3 Cool at 20° C./min to 30° C. and hold for 5 mins.
Step 4 Re-heat from 30° C. to 400° C. at 20° C./min, recording the Tg, Tn, Tm, $\Delta$Hn and $\Delta$Hm.

From the DSC trace resulting from the scan in step 4, the onset of the Tg was obtained as the intersection of the lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reached a maximum.

The Heat of Fusion for melting ($\Delta$Hm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which for the polymer tested is 130 J/g.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An enclosure or housing for encasing an electronic device, the enclosure or housing comprising a first part and a second part that are adhered to one another, wherein said second part is in contact with said first part, a surface of said second part that is in contact with said first part is pretreated with a treatment selected from the group consisting of flame treatment, mechanical abrasion, and chemical treatment, wherein the chemical treatment is etching and is performed to improve adhesion of said second part to said first part, the adhesion occurring after the chemical treatment, wherein the second part has a non-circular cross-section, and wherein:
   (i) said first part comprises a polymer having a repeat unit of formula

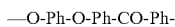
   —O-Ph-O-Ph-CO-Ph-                                         I and a repeat unit of formula

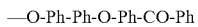
   —O-Ph-Ph-O-Ph-CO-Ph-                                      II wherein Ph represents a phenylene moiety, and wherein said repeat units I and II are in the relative molar proportions I:II of from 65:35 to 95:5;
   (ii) said second part comprises a metal; and
   (iii) said polymer is in contact with less than 85% of the total surface area of the second part.

2. An enclosure or housing according to claim 1, wherein said second part comprises a metal selected from aluminium and steel.

3. An enclosure or housing according to claim 1, wherein said second part comprises aluminium.

4. An enclosure or housing according to claim 1, wherein, in said polymer, the following relationship applies:

$$\log_{10}(X\%) > 1.50 - 0.26 MV;$$

wherein X % refers to the % crystallinity measured as described in Example 22 and MV refers to the melt viscosity measured using capillary rheometry operating at 340° C. at a shear rate of 1000 s$^{-1}$ using a circular cross-section tungsten carbide die, 0.5 mm (capillary diameter)×3.175 mm (capillary length).

5. An enclosure or housing according to claim 1, wherein said repeat unit of formula I has the structure:

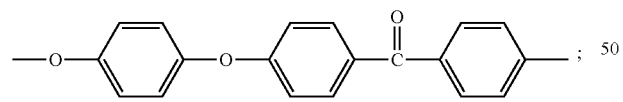
III and said repeat unit of formula II has the structure:

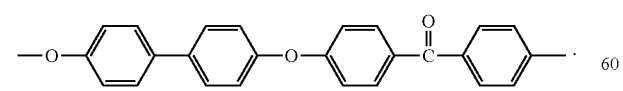
IV

6. An enclosure or housing according to claim 5, wherein said polymer includes 68-82 mol % of units of formula III and 18-32 mol % of units of formula IV.

7. An enclosure or housing according to claim 5, wherein the sum of the mol % of units of formula III and IV in said polymer is at least 95 mol % and the ratio defined as the mol % of the units of formula III divided by the mol % of units of formula IV is in the range 1.8 to 5.6.

8. An enclosure or housing according to claim 1, wherein the Tm of said polymer is in the range 290-310° C.

9. An enclosure or housing according to claim 1, wherein said polymer is part of a composition which includes said polymer and a filler.

10. An enclosure or housing according to claim 9, wherein said filler is selected from glass fiber, carbon fiber, aramid fibers, carbon black and a fluorocarbon resin.

11. An enclosure or housing according to claim 9, wherein said composition includes greater than 10 wt % of filler.

12. An enclosure or housing according to claim 1, wherein the area of the first part in contact with the second part is at least 1 cm$^2$; the thickness of the first part measured perpendicular to the interface between the first and second parts is at least 1 mm and is less than 20 mm; and the thickness of the second part measured perpendicular to the interface between the first and second parts is at least 1 mm and less than 20 mm.

13. An enclosure or housing according to claim 1, wherein said first part overlies said second part.

14. An enclosure or housing according to claim 1, wherein said enclosure or housing is part of a mobile electronics device.

15. An enclosure or housing according to claim 1, wherein said second part comprises titanium.

16. An enclosure or housing according to claim 1, wherein a bond strength between the second part and the first part is 54.364 N.

17. An enclosure or housing according to claim 1, wherein said first part is a part that is overmoulded on said second part.

18. An enclosure or housing according to claim 1, wherein said second part is preformed and said first part is injection moulded onto said second part.

19. A method of making an enclosure or housing for an electronic device, the method comprising:
   (a) selecting a second part lacking a circular cross-section and comprising a metal;
   (b) selecting a first part comprising a polymer or selecting a precursor of said first part which comprises said polymer, wherein said first part comprises a polymer having a repeat unit of formula

   —O-Ph-O-Ph-CO-Ph-                                         I and a repeat unit of formula

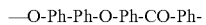
   —O-Ph-Ph-O-Ph-CO-Ph-                                      II wherein Ph represents a phenylene moiety, and wherein said repeat units I and II are in the relative molar proportions I:II of from 65:35 to 95:5; and;
   (c) contacting said second part with said first part or said precursor by overmoulding said second part on said first part or said precursor to adhere said second part and said first part or said precursor to one another, wherein a surface of said second part that is contacted with said first part or said precursor is pretreated with a treatment selected from the group consisting of flame treatment, mechanical abrasion, and chemical treatment, wherein the chemical treatment is etching and is performed to improve adhesion of said second part to said first part or said precursor, the adhesion occurring after the chemical treatment, and wherein said polymer is in contact with less than 85% of the total surface area of said second part.

20. A method according claim 19, wherein, prior to step (c), said second part is treated to alter its surface with which said first part or precursor is subsequently contacted.

21. A method according to claim 20, wherein said treatment comprises a step which comprises treating the second part with an oxidizing formulation which includes a $Fe^{3+}$ compound.

22. An enclosure or housing for an electronic device, the enclosure or housing comprising a first part and a second part that are adhered to one another, wherein said second part is in contact with said first part, a surface of said second part that is in contact with said first part is pretreated with a treatment selected from the group consisting of flame treatment, mechanical abrasion, and chemical treatment is etching and is performed to improve adhesion of said second part to said first part, the adhesion occurring after the chemical treatment, and wherein:

(i) said first part comprises a polymer having a repeat unit of formula

—O-Ph-O-Ph-CO-Ph-    I and a repeat unit of formula

—O-Ph-Ph-O-Ph-CO-Ph-    II wherein Ph represents a phenylene moiety;
(ii) said second part comprises a metal;
(iii) said polymer is in contact with less than 85% of the total surface area of the second part; and
(iv) said second part is devoid of any circular cross-section.

* * * * *